(12) United States Patent
Zhang

(10) Patent No.: US 12,095,197 B1
(45) Date of Patent: Sep. 17, 2024

(54) SILICONE CHARGING COMPONENT WITH MAGNETIC AND CONDUCTIVE

(71) Applicant: Shenzhen Shengyou Technology Co., Ltd, Shenzhen (CN)

(72) Inventor: Shaojun Zhang, Shenzhen Guangdong (CN)

( * ) Notice: Subject to any disclaimer, the term of this patent is extended or adjusted under 35 U.S.C. 154(b) by 0 days.

(21) Appl. No.: 18/431,992

(22) Filed: Feb. 4, 2024

(30) Foreign Application Priority Data

Aug. 9, 2023 (CN) .......................... 202322129237.7

(51) Int. Cl.
*H01R 13/00* (2006.01)
*H01R 13/50* (2006.01)
*H01R 13/03* (2006.01)
*H01R 13/22* (2006.01)

(52) U.S. Cl.
CPC ............. *H01R 13/50* (2013.01); *H01R 13/03* (2013.01); *H01R 13/22* (2013.01)

(58) Field of Classification Search
CPC ......... H01R 13/50; H01R 13/03; H01R 13/22
See application file for complete search history.

(56) References Cited

U.S. PATENT DOCUMENTS

| | | | | |
|---|---|---|---|---|
| 11,518,759 B1 * | 12/2022 | Liang | ................... | C07D 417/14 |
| 11,530,195 B1 * | 12/2022 | Liang | ................... | C07D 401/14 |
| 11,612,603 B1 * | 3/2023 | Liang | ..................... | A61P 31/14 |
| | | | | 514/241 |

* cited by examiner

*Primary Examiner* — Phuong Chi Thi Nguyen

(57) ABSTRACT

A silicone charging component with magnetic and conductive is disclosed, which belongs to technical field of silicone magnetic charging. The silicone charging component includes a charging female body with magnetic and conductive, the charging female body with magnetic and conductive is configured with a female silicone base on an outer wall thereon, and the charging female body and the female silicone base are manufactured by integrated. The charging female body with magnetic and conductive is connected with an electric wire at bottom thereon. The charging female body with magnetic and conductive is configured with several, and each charging female body with magnetic and conductive is configured to be wrapped by the female silicone base and a top and a bottom thereon are exposed. By such designs, it can prolong service life of products.

6 Claims, 4 Drawing Sheets

SILICONE CHARGING COMPONENT WITH MAGNETIC AND CONDUCTIVE

TECHNICAL FIELD

The present application relates to the technical field of silicone magnetic charging, and in particular to a silicone charging component with magnetic and conductive.

BACKGROUND

At present, charging components of many electronic products on market are magnetic charging structures, and their charging method is that through suction mode of magnetic male and female connectors to achieve an effect of connecting charging. The male and female connectors are generally hard metal materials, when the male and female connectors close to each other, which may be automatically adsorbed to connect for charging. Magnetic charging has a faster transmission speed, easy to use, and may be operated with one hand, regardless of positive and negative, thus it may be applied to various industries.

However, the female connector is exposed when not charging, and due to the female connector is made of hard metal materials, gaps in edges of the female connector is easy to enter dust, moisture and other impurities. Most of such products will be glued to achieve dustproof and waterproof effects, but their assembly operations are cumbersome, and the glue contains harmful substances, which is not environmentally friendly and is not aging-resistant, especially not suitable for use in contact with human skin, such as facial cleansing instruments, electric toothbrushes, electric massagers, etc. Moreover, poor waterproofing and sealing of the female connector will lead to poor charging contact and also affect service life of the products. Therefore, the present disclosure proposes a silicone charging component with magnetic and conductive to solve above problems.

SUMMARY

In order to remedy above deficiencies, the present disclosure aims to provide a novelty silicone charging component with magnetic and conductive, to overcome above technical problems or at least partially solve the above problems.

In some embodiments of the present disclosure, a silicone charging component with magnetic and conductive is provided, which includes a charging female body with magnetic and conductive. The charging female body with magnetic and conductive is configured with a female silicone base on an outer wall thereon, and the charging female body and the female silicone base are manufactured by integrated. The charging female body with magnetic and conductive is connected with an electric wire at bottom thereon.

In some preferred embodiments of the present disclosure, the charging female body with magnetic and conductive is configured with several, and each charging female body with magnetic and conductive is configured to be wrapped by the female silicone base and a top and a bottom thereon are exposed.

In some preferred embodiments of the present disclosure, the charging female body with magnetic and conductive is configured with several, each charging female body with magnetic and conductive is an independent individual and its shape and position may be adjusted.

In some preferred embodiments of the present disclosure, the charging female body with magnetic and conductive is made of a mixture of conductive material, magnetic conductive material, and silicone material. Herein the conductive material includes silver, copper, aluminum, stainless steel, conductive carbon black, and alloy conductive. The magnetic conductive material includes pure iron, nickel, and cobalt. The conductive material and the magnetic conductive material are in powder or granular form.

In some preferred embodiments of the present disclosure, the charging female body with magnetic and conductive is configured with two and both are of cylindrical, and two charging female bodies with magnetic and conductive are arranged side by side and a distance between therein is adjustable.

In some preferred embodiments of the present disclosure, the charging female body with magnetic and conductive is configured with two, and two charging female bodies with magnetic and conductive respectively are a first charging female body with magnetic and conductive and a second charging female body with magnetic and conductive. Herein the first charging female body with magnetic and conductive is of cylindrical, and the second charging female body with magnetic and conductive is of hollow cylindrical. The second charging female body with magnetic and conductive has a hollow diameter greater than a diameter of the first charging female body with magnetic and conductive, the first charging female body with magnetic and conductive is disposed in a middle of the second charging female body with magnetic and conductive and does not intersect. The first charging female body with magnetic and conductive and the second charging female body with magnetic and conductive are configured to be wrapped by the female silicone base and tops and bottoms thereon are exposed, the first charging female body with magnetic and conductive and the second charging female body with magnetic and conductive are connected to an electric wire of the first charging female body with magnetic and conductive and an electric wire of the second charging female body with magnetic and conductive at bottom thereon respectively.

The silicone charging component with magnetic and conductive of the present disclosure has at least following beneficial effects and advantages.

1. By designing the charging female body with magnetic and conductive and the female silicone base, then manufacturing the charging female body and the female silicone base by integrated, without need to use glue to bond edges, which can greatly improve environmental friendliness and safety of such products, and also can solve problems of dust, moisture and other impurities entering into holes through gaps, thereby can prolong service life of the products.

2. By setting the female silicone base as silicone materials, due to silicone can be combined with silicone or plastic molding, the whole product can be made seamless and non-porous during production, so as to achieve better anti-dust, waterproof and anti-impurity effects.

BRIEF DESCRIPTION OF THE DRAWINGS

In order to more clearly illustrate technical solutions of embodiments of the present disclosure, the following will be a brief introduction to accompanying drawings that required to be used in the embodiments of the present disclosure. It should be understood that following accompanying drawings only show some embodiments of the present disclosure, and therefore should not be regarded as a limitation of the scope of the present invention. For a person of ordinary skill in the art, other relevant accompanying drawings can be obtained based on these drawings without creative labor.

Figure 1:
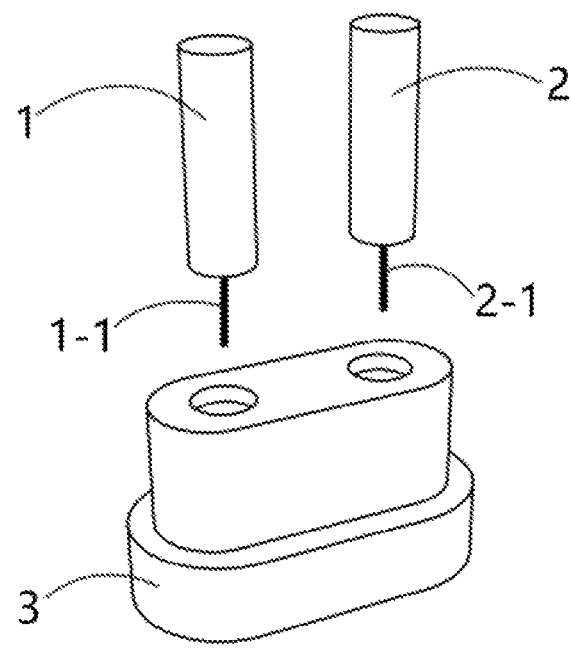
FIG. 1 illustrates an exploded schematic diagram of a silicone charging component with magnetic and conductive in accordance with some embodiments of the present disclosure.
Figure 2:
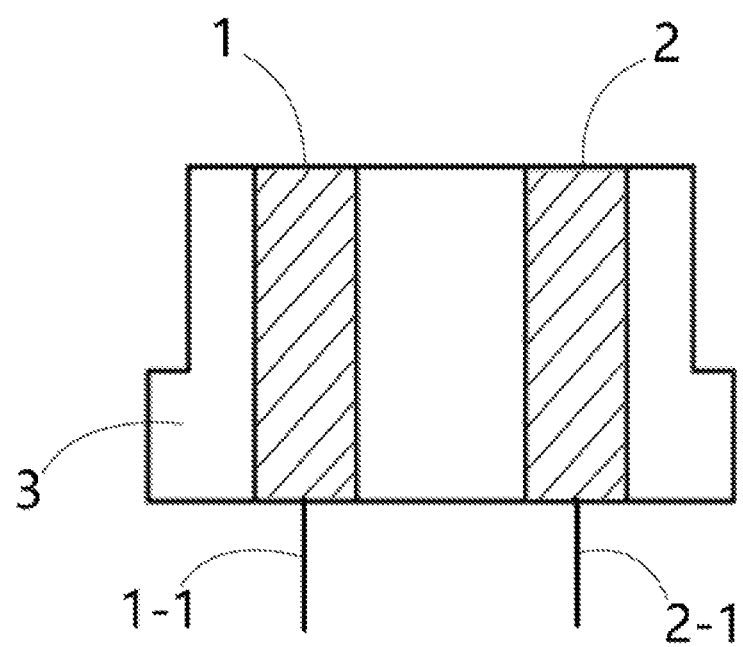
FIG. 2 illustrates a structural section schematic diagram of the silicone charging component with magnetic and conductive in accordance with some embodiments of the present disclosure.

In the drawings, reference signs are as follows.
1 Charging female body with magnetic and conductive
1-1 Electric wire of the first charging female body with magnetic and conductive
2 Second charging female body with magnetic and conductive
2-1 Electric wire of the second charging female body with magnetic and conductive
3 Female silicone base

DETAILED DESCRIPTION OF THE EMBODIMENTS

In order to make objectives, technical solutions and advantages of the embodiments of the present disclosure more clear, the technical solutions of the embodiments of the present disclosure will be described in detail and completely below in conjunction with accompanying drawings in the embodiments of the present disclosure. Obviously, described embodiments are only a part of embodiments of the present disclosure, and not all of the embodiments of the present disclosure. Based on the embodiments of the present disclosure, all other embodiments obtained by a person of ordinary skill in the art without creative labor shall fall within the scope of protection of the present invention.

As shown in FIG. 1 to FIG. 4, in some embodiments of the present disclosure, a silicone charging component with magnetic and conductive is provided, including a charging female body with magnetic and conductive. Herein the charging female body with magnetic and conductive is configured with a female silicone base 3 on an outer wall thereon, and the charging female body and the female silicone base 3 are manufactured by integrated. The charging female body with magnetic and conductive is connected with an electric wire at bottom thereon. In some embodiments of the present disclosure, the charging female body with magnetic and conductive is configured with several, and each charging female body with magnetic and conductive is configured to be wrapped by the female silicone base and a top and a bottom thereon are exposed. In some embodiments of the present disclosure, the charging female body with magnetic and conductive is configured with several, each charging female body with magnetic and conductive is an independent individual and its shape and position may be adjusted. Herein the charging female body with magnetic and conductive is made of a mixture of conductive material, magnetic conductive material, and silicone material. The conductive material includes silver, copper, aluminum, stainless steel, conductive carbon black, and alloy conductive. The magnetic conductive material includes pure iron, nickel, and cobalt. The conductive material and the magnetic conductive material are in powder or granular form. In some preferred embodiments of the present disclosure, the charging female body with magnetic and conductive is configured with two and both are of cylindrical, and two charging female bodies with magnetic and conductive are arranged side by side and a distance between therein is adjustable. In some preferred embodiments of the present disclosure, the female silicone base 3 is made of silicone and its shape is adjustable.

Figure 3:
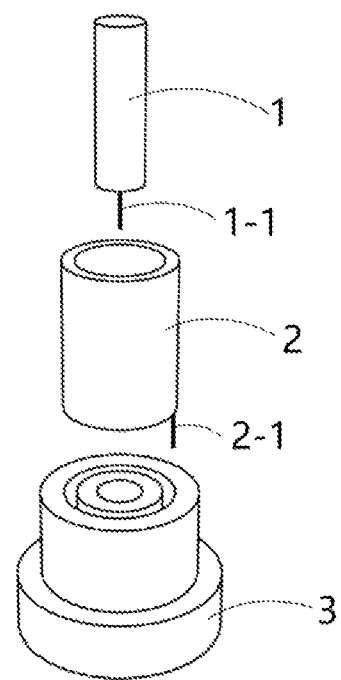
FIG. 3 illustrates another exploded schematic diagram of a silicone charging component with magnetic and conductive in accordance with some embodiments of the present disclosure.
Figure 4:
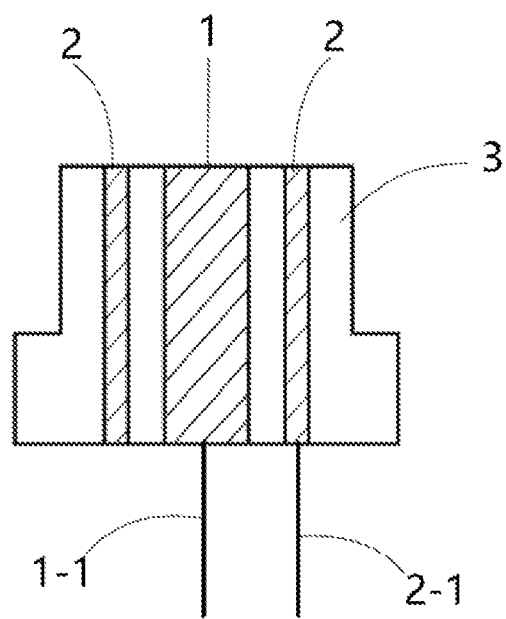
FIG. 4 illustrates another structural section schematic diagram of the silicone charging component with magnetic and conductive in accordance with some embodiments of the present disclosure.

As shown in FIG. 3 and FIG. 4, in some preferred embodiments of the present disclosure, the charging female body with magnetic and conductive is configured with two, and two charging female bodies with magnetic and conductive respectively are a first charging female body with magnetic and conductive 1 and a second charging female body with magnetic and conductive 2. Herein the first charging female body with magnetic and conductive 1 is of cylindrical, and the second charging female body with magnetic and conductive 2 is of hollow cylindrical. The second charging female body with magnetic and conductive 2 has a hollow diameter greater than a diameter of the first charging female body with magnetic and conductive 1, the first charging female body with magnetic and conductive 1 is disposed in a middle of the second charging female body with magnetic and conductive 2 and does not intersect. The first charging female body with magnetic and conductive 1 and the second charging female body with magnetic and conductive 2 are configured to be wrapped by the female silicone base 3 and tops and bottoms thereon are exposed, the first charging female body with magnetic and conductive 1 and the second charging female body with magnetic and conductive 2 are connected to an electric wire 1-1 of the first charging female body with magnetic and conductive and an electric wire 2-1 of the second charging female body with magnetic and conductive at bottom thereon respectively. The first charging female body with magnetic and conductive 1, the second charging female body with magnetic and conductive 2, and the female silicone base 3 are integrated by molding, without need to use glue to bond edges, which can greatly improve environmental friendliness and safety of such products. In addition, the female silicone base 3 is made of silicone, due to silicone belongs to flexible materials and is sealing components that most of electronic products may used, so it can play a better sealing effect. Moreover, silicone can be integrated with silicone or plastic to form a seamless state, without use of glue to assemble magnetic charging female connector, which can greatly improve safety of the products, and also can extend service life of the products.

Specifically, working process or principle of the silicone charging component with magnetic and conductive according of the present disclosure is described as follows. By setting the first charging female body with magnetic and conductive 1, the second charging female body with magnetic and conductive 2, and the female silicone base 3, then making them be integrally formed as a whole, without need to use glue to bond edges, which can greatly improve environmental friendliness and safety of such products. Moreover, the female silicone base 3 made of silicone, due to silicone belongs to flexible materials and is sealing components that most of electronic products may used, so it can play a better sealing effect. In addition, silicone can be integrated with silicone or plastic to form a seamless state, without use of glue to assemble magnetic charging female connector, which can greatly improve safety of the products, and also can extend service life of the products.

What is claimed is:

1. A silicone charging component with magnetic and conductive, comprising a charging female body with magnetic and conductive;
 wherein the charging female body with magnetic and conductive is configured with a female silicone base (3) on an outer wall thereon, and the charging female body and the female silicone base (3) are manufactured by integrated; and
 wherein the charging female body with magnetic and conductive is connected with an electric wire at bottom thereon.

2. The silicone charging component with magnetic and conductive according to claim 1, wherein the charging female body with magnetic and conductive is configured with several, and each charging female body with magnetic and conductive is configured to be wrapped by the female silicone base and a top and a bottom thereon are exposed.

3. The silicone charging component with magnetic and conductive according to claim 1, wherein the charging female body with magnetic and conductive is configured with several, and each charging female body with magnetic and conductive is an independent individual.

4. The silicone charging component with magnetic and conductive according to claim 1, wherein the charging female body with magnetic and conductive is made of a mixture of conductive material, magnetic conductive material, and silicone material; and
 wherein the conductive material comprises silver, copper, aluminum, stainless steel, conductive carbon black, and alloy conductive;
 wherein the magnetic conductive material comprises pure iron, nickel, and cobalt; and
 wherein the conductive material and the magnetic conductive material are in powder or granular form.

5. The silicone charging component with magnetic and conductive according to claim 1, wherein the charging female body with magnetic and conductive is configured with two and two charging female bodies with magnetic and conductive are arranged side by side, and a distance between therein is adjustable.

6. The silicone charging component with magnetic and conductive according to claim 1, wherein the charging female body with magnetic and conductive is configured with two, and two charging female bodies with magnetic and conductive respectively are a first charging female body with magnetic and conductive (1) and a second charging female body with magnetic and conductive (2); and
 wherein the first charging female body with magnetic and conductive (1) is of cylindrical, and the second charging female body with magnetic and conductive (2) is of hollow cylindrical;
 wherein the second charging female body with magnetic and conductive (2) has a hollow diameter greater than a diameter of the first charging female body with magnetic and conductive (1);
 wherein the first charging female body with magnetic and conductive (1) is disposed in a middle of the second charging female body with magnetic and conductive (2) and does not intersect;
 wherein the first charging female body with magnetic and conductive (1) and the second charging female body with magnetic and conductive (2) are configured to be wrapped by the female silicone base and tops and bottoms thereon are exposed; and
 wherein the first charging female body with magnetic and conductive (1) and the second charging female body with magnetic and conductive (2) are connected to an electric wire (1-1) of the first charging female body with magnetic and conductive and an electric wire (2-1) of the second charging female body with magnetic and conductive at bottom thereon respectively.

* * * * *